United States Patent
Pan et al.

(10) Patent No.: US 11,061,403 B2
(45) Date of Patent: Jul. 13, 2021

(54) PATH PLANNING WITH A PREPARATION DISTANCE FOR A LANE-CHANGE

(71) Applicant: Baidu USA LLC, Sunnyvale, CA (US)

(72) Inventors: Jiacheng Pan, Sunnyvale, CA (US); Jiaxuan Xu, Sunnyvale, CA (US); Jinyun Zhou, Sunnyvale, CA (US); Hongyi Sun, Sunnyvale, CA (US); Shu Jiang, Sunnyvale, CA (US); Jiaming Tao, Sunnyvale, CA (US); Yifei Jiang, Sunnyvale, CA (US); Jiangtao Hu, Sunnyvale, CA (US); Jinghao Miao, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 0 days.

(21) Appl. No.: 16/712,035

(22) Filed: Dec. 12, 2019

(65) Prior Publication Data

US 2021/0181742 A1 Jun. 17, 2021

(51) Int. Cl.
*G08G 1/16* (2006.01)
*G05D 1/00* (2006.01)
*G05D 1/02* (2020.01)
*G06K 9/00* (2006.01)

(52) U.S. Cl.
CPC ......... *G05D 1/0088* (2013.01); *G05D 1/0212* (2013.01); *G05D 1/0246* (2013.01); *G06K 9/00791* (2013.01); *G08G 1/167* (2013.01); *G05D 2201/0213* (2013.01)

(58) Field of Classification Search
CPC .. G05D 1/0088; G05D 1/0212; G05D 1/0246; G06K 9/00791; G08G 1/167; B60W 30/12; B60W 30/18163
USPC .................. 340/435, 436, 438; 342/357.23; 701/213, 301
See application file for complete search history.

(56) References Cited

U.S. PATENT DOCUMENTS

| 8,718,861 B1 * | 5/2014 | Montemerlo | B60W 50/082 701/26 |
|---|---|---|---|
| 10,668,925 B2 * | 6/2020 | Zhu | B60W 30/18163 |
| 2018/0043935 A1 * | 2/2018 | Hashimoto | B62D 15/0255 |
| 2019/0079514 A1 * | 3/2019 | Zhu | B60W 30/00 |

* cited by examiner

*Primary Examiner* — Daniel Previl
(74) *Attorney, Agent, or Firm* — Womble Bond Dickinson (US) LLP

(57) ABSTRACT

A driving environment is perceived based on sensor data obtained from a plurality of sensors mounted on the ADV. In response to a request for changing lane from a first lane to a second lane, path planning is performed. The path planning includes identifying a first lane change point for the ADV to change from the first lane to the second lane in a first trajectory of the ADV, determining a lane change preparation distance with respect to the first lane change point, and generating a second trajectory based on the lane change preparation distance, where the second trajectory having a second lane change point delayed from the first lane change point. Speed planning is performed on the second trajectory to control the ADV to change lane according to the second trajectory with different speeds at different point in time.

21 Claims, 10 Drawing Sheets

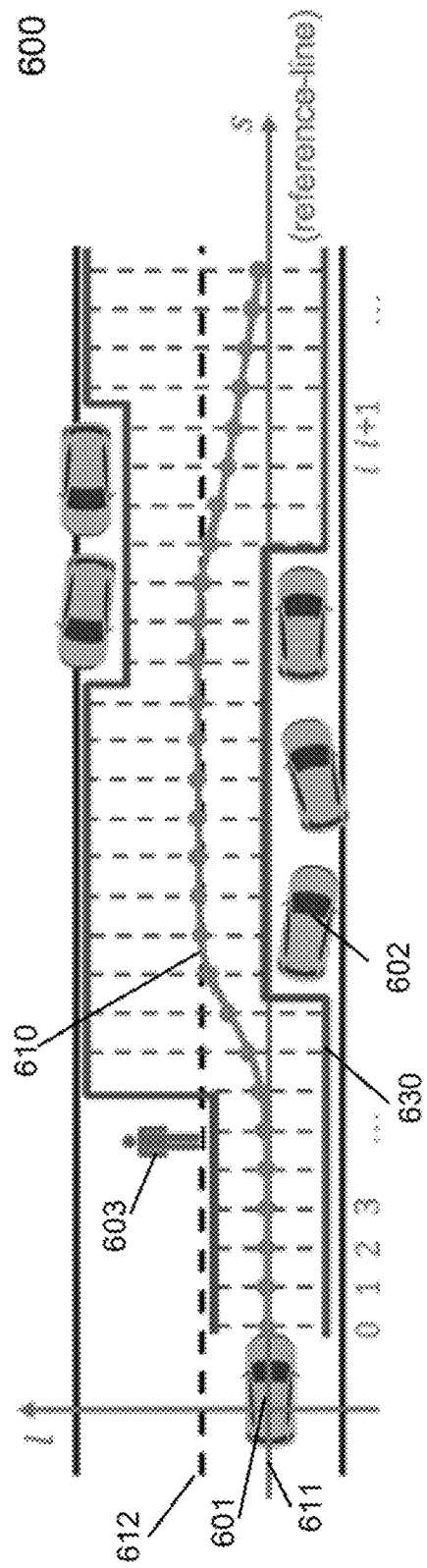
FIG. 6
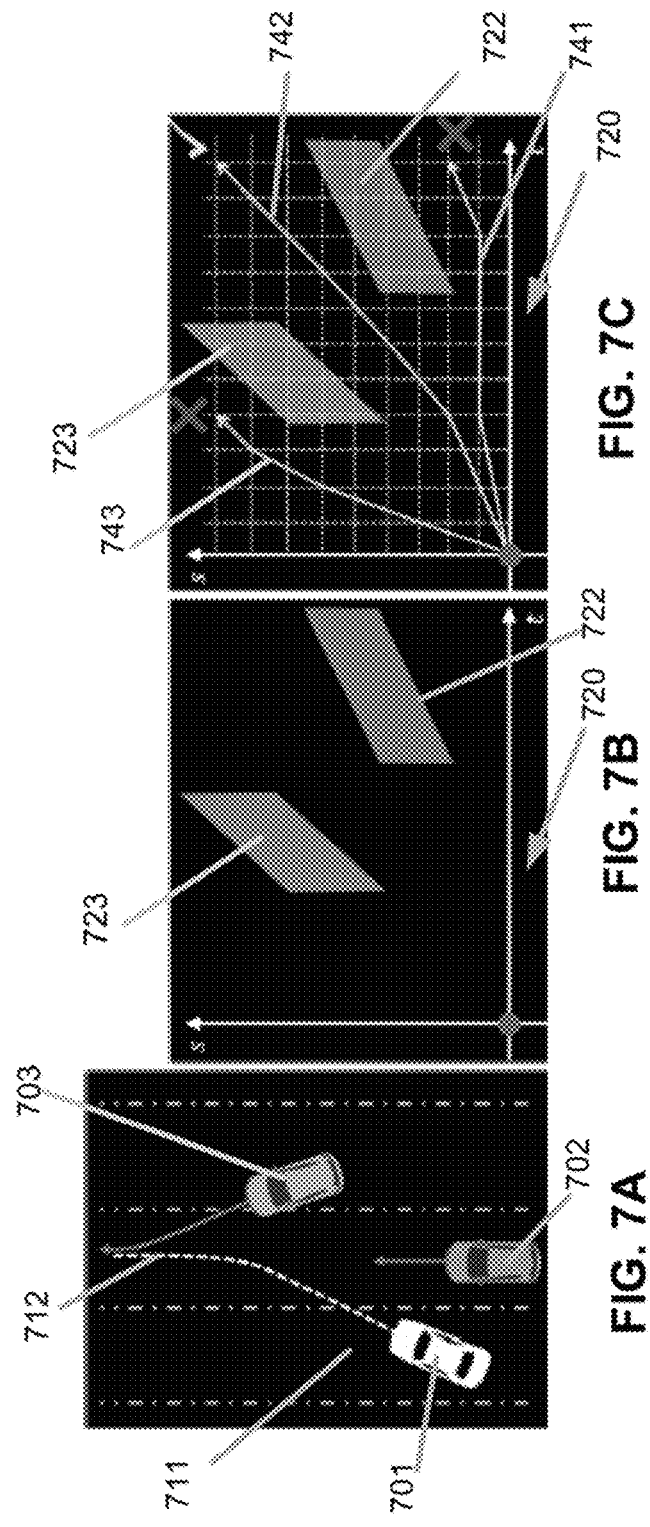
FIG. 7A
FIG. 7B
FIG. 7C

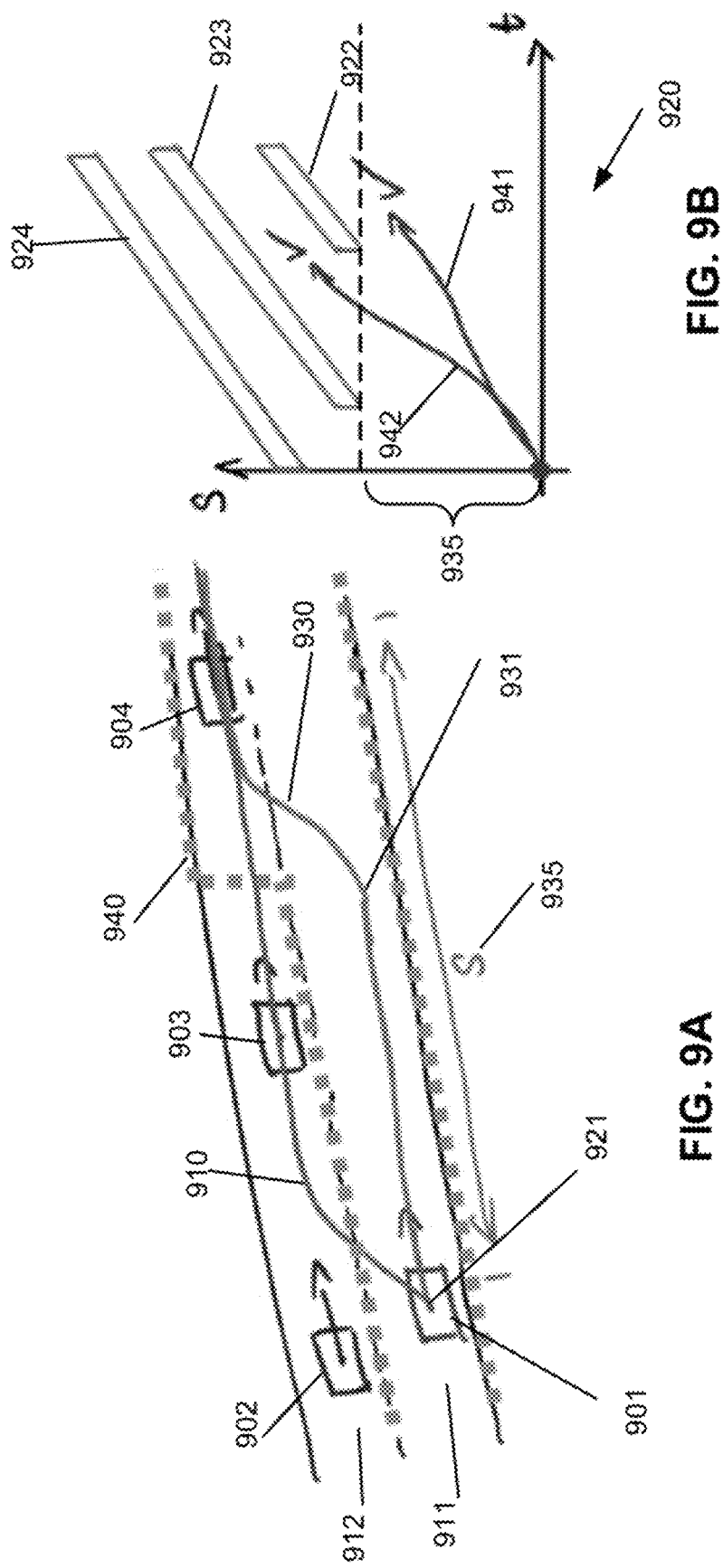

PATH PLANNING WITH A PREPARATION DISTANCE FOR A LANE-CHANGE

TECHNICAL FIELD

Embodiments of the present disclosure relate generally to operating autonomous vehicles. More particularly, embodiments of the disclosure relate to planning for a lane-changing for an autonomous driving vehicle (ADV).

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. Safe and agile lane-changing, especially during heavy traffic, is difficult for an ADV, due to dynamic interactions with other obstacles. Conventional motion planning operations do not consider the dynamic interactions in certain situations. For example, when there is a moving obstacle right next to the ADV, the ADV may need to go along an original lane longer to find a possible gap for a lane-changing, rather than directly starting the lane-changing. Therefore, there may be a need for improving motion planning operations for the lane-changing for the ADV.

BRIEF DESCRIPTION OF THE DRAWINGS

Embodiments of the disclosure are illustrated by way of example and not limitation in the figures of the accompanying drawings in which like references indicate similar elements.

FIG. 6 illustrates path planning for a lane change.

FIGS. 7A-7C illustrate speed planning for a lane change.

FIG. 9A is a diagram illustrating an example of a method for planning for a lane-changing for an ADV according to one embodiment.

FIG. 9B illustrates a station-time graph (ST graph) in the example in FIG. 9A.

DETAILED DESCRIPTION

Figure 1:
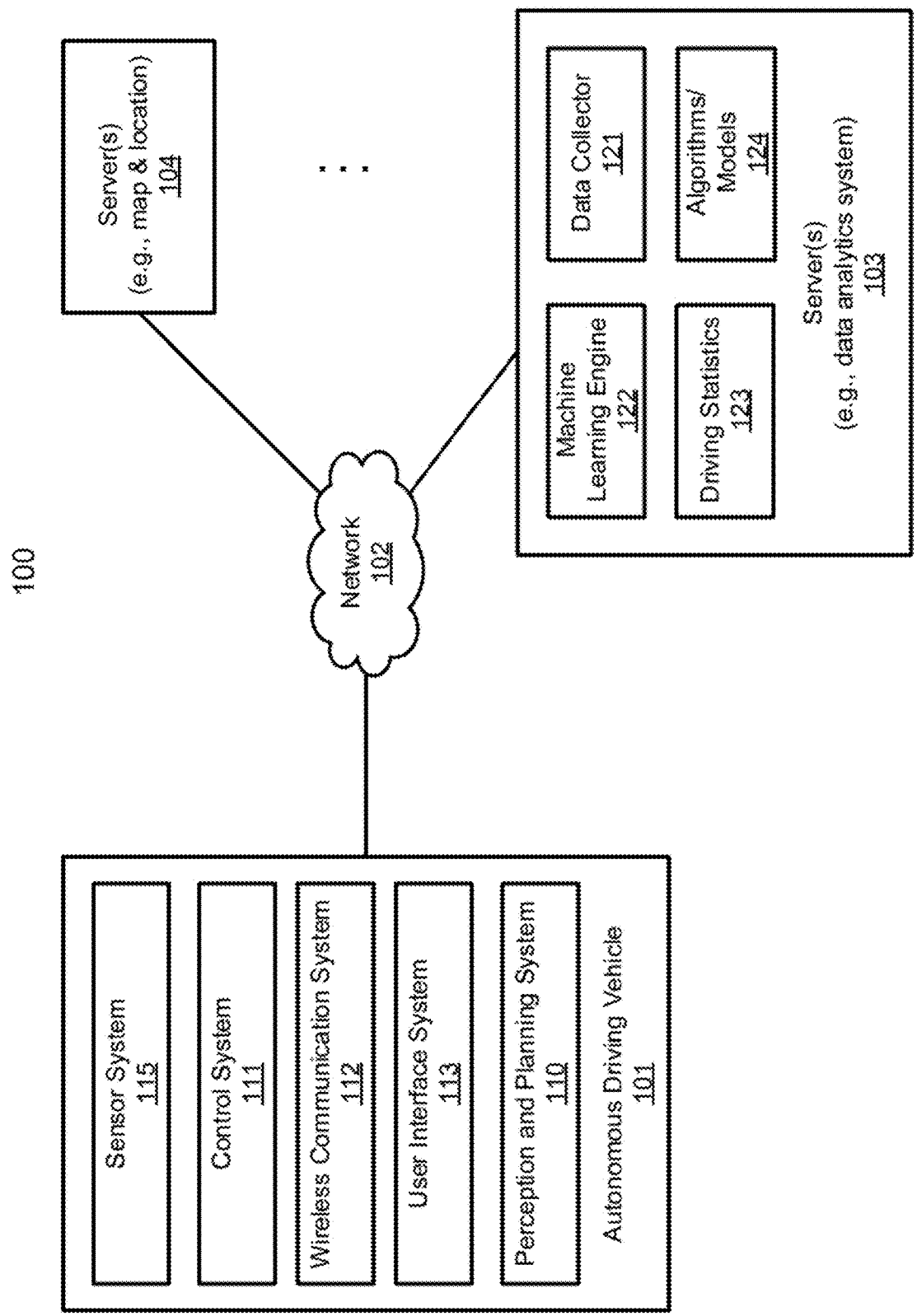
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, before a lane-changing from an original lane to a target lane for an ADV, a lane change preparation distance is estimated. Then, a new path of the ADV is planned based on the lane change preparation distance, rather than only a speed of the ADV is manipulated. Compared with a previously generated path that initiates a lane-changing immediately, the new path has a new lane change point delayed from a previously generated lane change point, where the new path stays in the original lane yet leans towards the target lane nevertheless before the new lane-changing point. In this way, the lane-changing task for speed planning is simplified, and the overall planned trajectory is safe, smooth and intelligent.

According to one embodiment, a driving environment is perceived based on sensor data obtained from a plurality of sensors mounted on the ADV, for example, one or more obstacles are detected. In response to a request for changing lane from a first lane to a second lane, path planning is performed. The path planning includes identifying a first lane change point for the ADV to change from the first lane to the second lane in a first trajectory of the ADV generated in view of the driving environment, determining a lane change preparation distance with respect to the first lane change point, and generating a second trajectory based on the lane change preparation distance, where the second trajectory having a second lane change point delayed from the first lane change point based on at least a portion of the lane change preparation distance. Speed planning is performed on the second trajectory to control the ADV to change lane from the first lane to the second lane according to the second trajectory with different speeds at different point in time.

In one embodiment, the second trajectory stays in the first lane and gradually leans towards the second lane within the lane change preparation distance. In one embodiment, the lane change preparation distance is determined based on a state of the ADV and the driving environment. In one embodiment, the lane change preparation distance may be determined based on a set of rules in view of a current traffic condition of the first lane and the second lane. In one embodiment, the set of rules may include one or more lane changing rules based on a speed of the ADV, or one or more distances of the ADV with respect to one or more obstacles. In one embodiment, the lane change preparation distance may be determined based on an iterative optimization algorithm. In one embodiment, the second path trajectory may be generated based on the iterative optimization algorithm. In one embodiment, the lane change preparation distance may be determined by applying a machine-learning model on a set of features describing a driving environment surrounding the ADV. In one embodiment, a station-time graph (ST graph) may be generated based on the lane change preparation distance.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
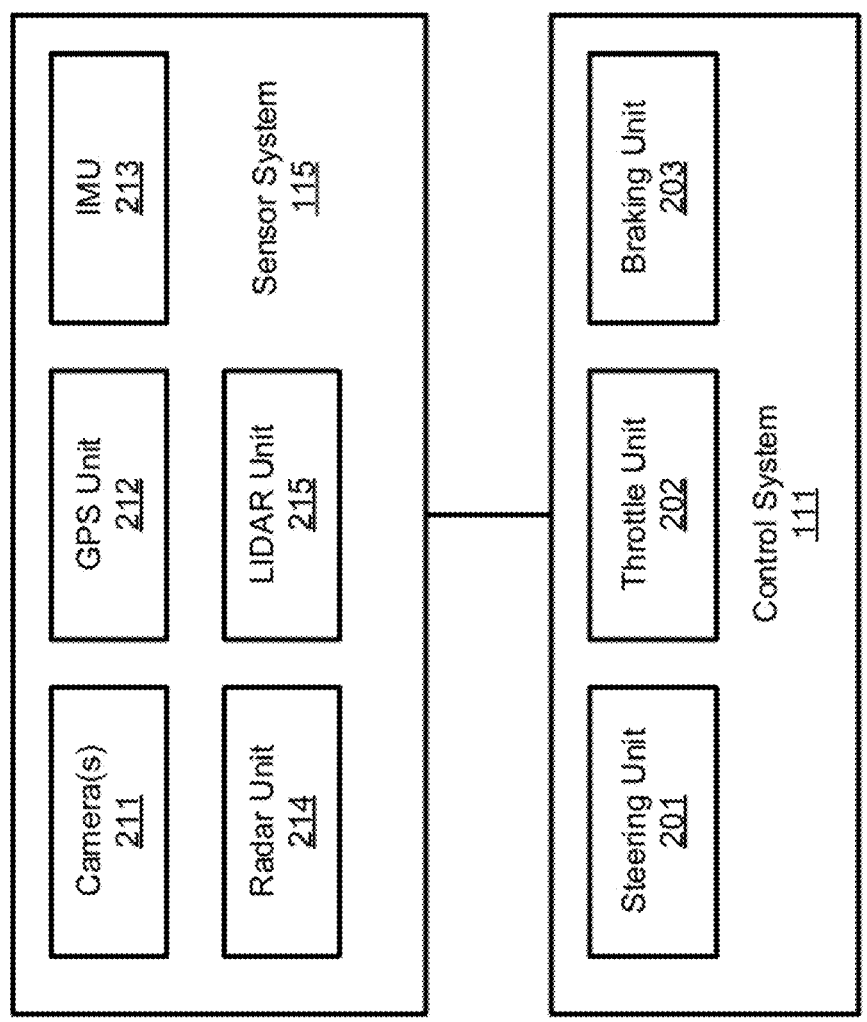
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, algorithms 124 may include a lane change algorithm or a lane change model to perform path planning and speed planning for a lane-changing. The lane change algorithm or model may include an algorithm or model to identify a first lane change point for the ADV, an algorithm or model to determine a lane change preparation distance, an algorithm or model to generate a second trajectory based on the lane change preparation distance and an algorithm or model to perform speed planning on the second trajectory to control the ADV to change lane. Algorithms 124 can then be uploaded on ADVs to be utilized during autonomous driving in real-time.

Figure 3A:
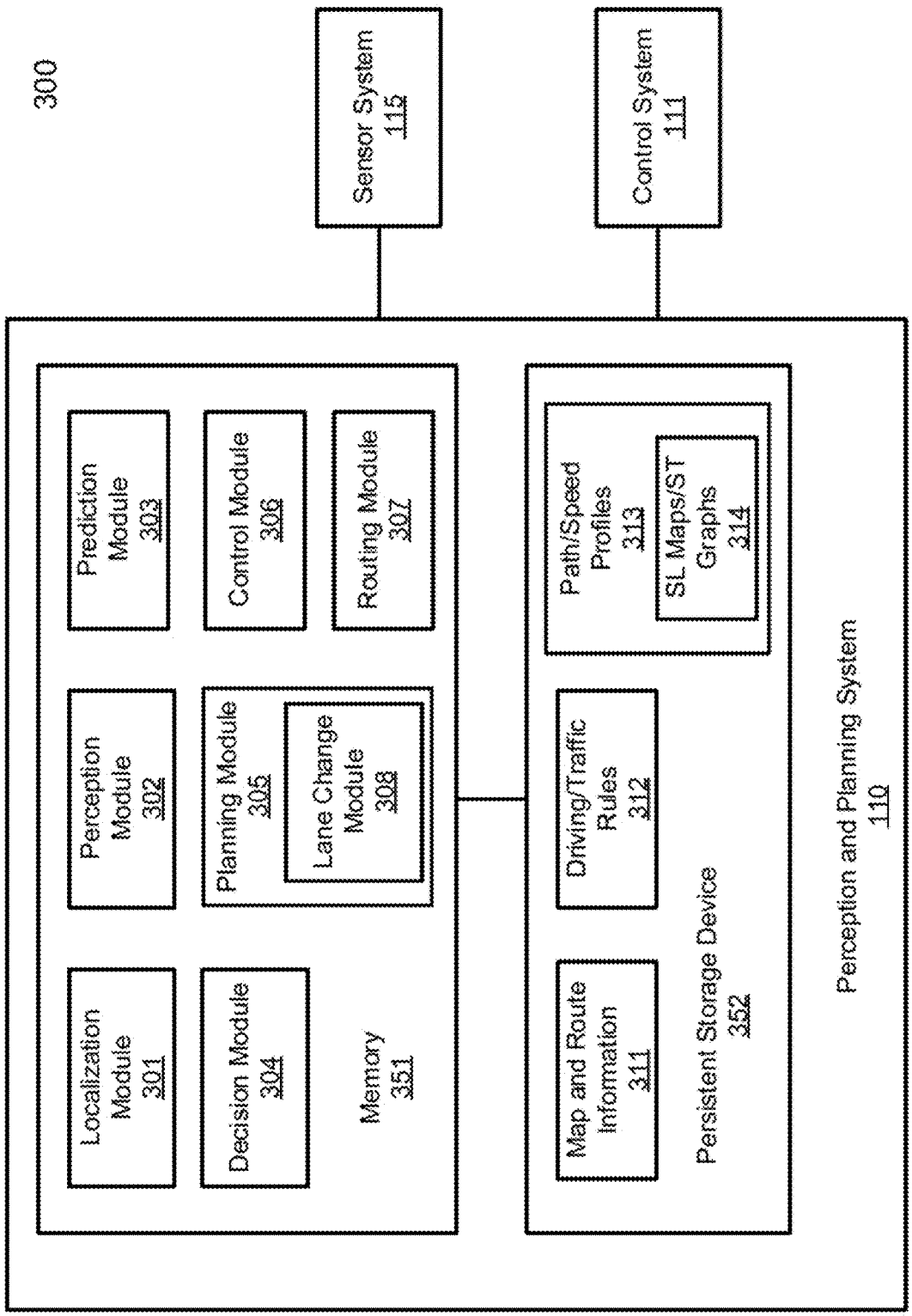
FIGS. 3A-3B are block diagrams illustrating an example of a perception and planning system used with an autonomous vehicle according to one embodiment.
Figure 3B:
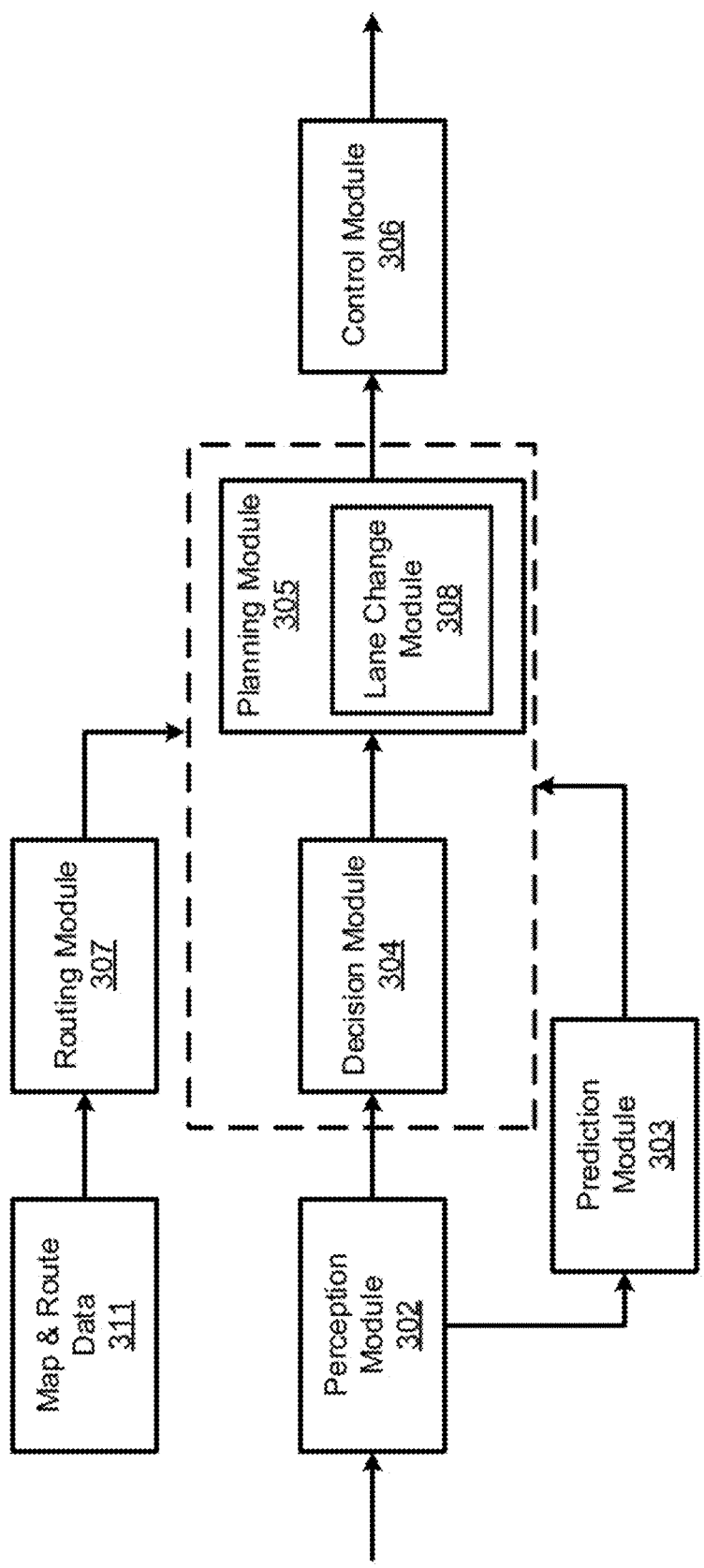

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing module 307 and lane change module 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 miles per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle. In one embodiment, planning module 305 includes a lane change module 308 responsible for changing lane, which will be described in details further below.

Figure 4:
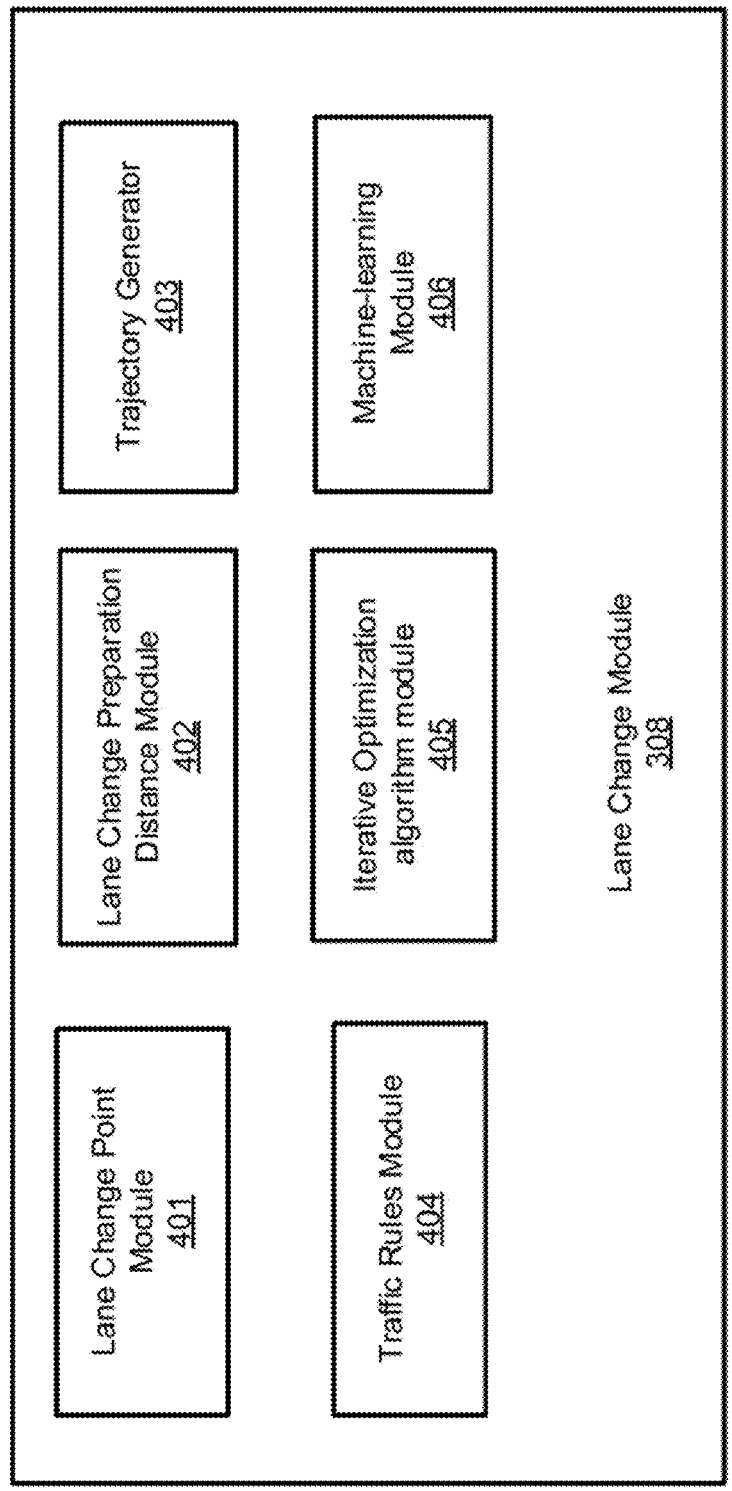
FIG. 4 is a block diagram illustrating an example of a lane change module according to one embodiment.
Figure 5:
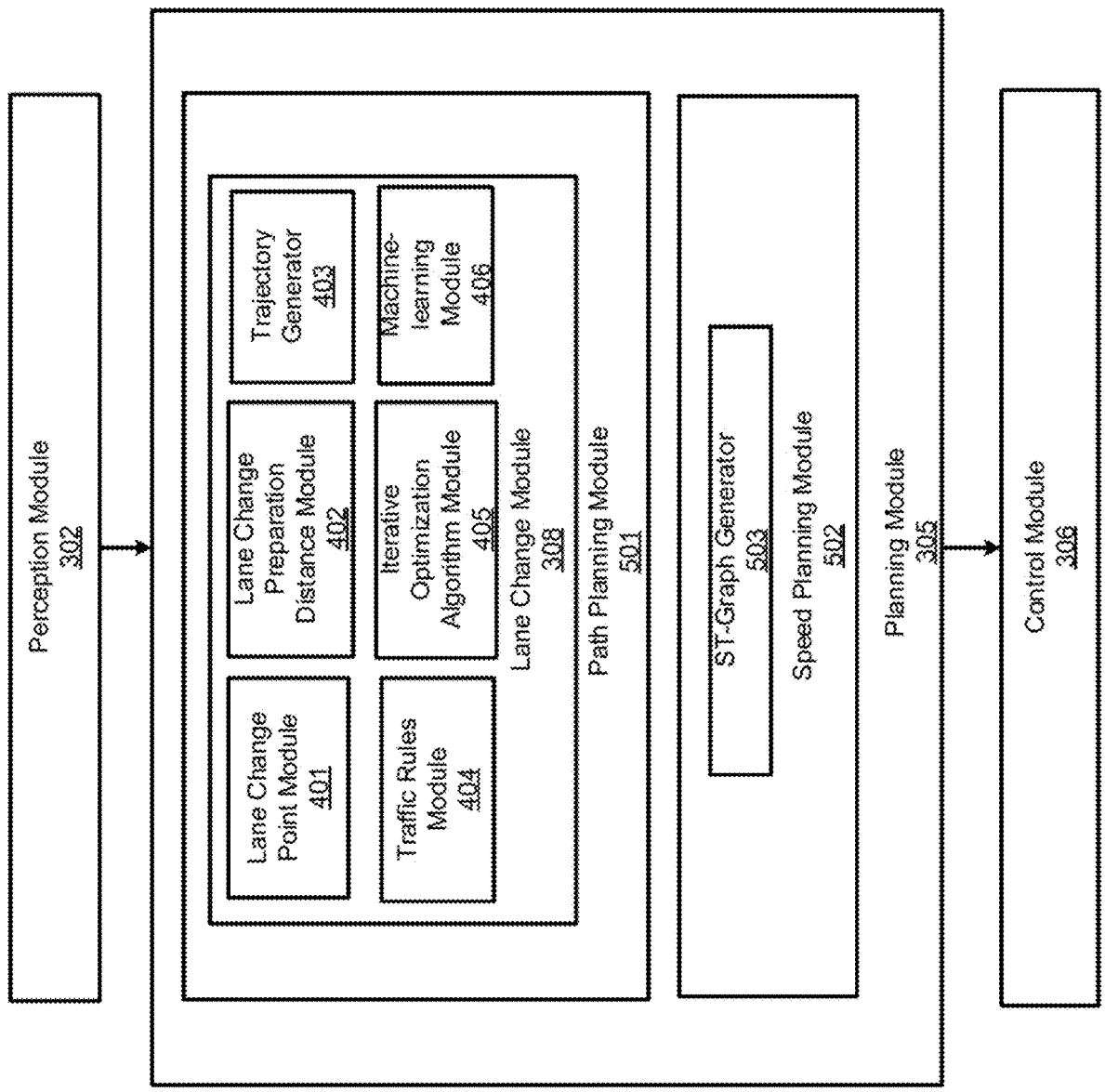
FIG. 5 is a processing flow diagram illustrating an example of planning for a lane change according to one embodiment.

FIG. 4 is a block diagram illustrating an example of a lane change module 308 according to one embodiment. FIG. 5 is a processing flow diagram illustrating an example of planning for a lane change according to one embodiment. Referring to FIG. 4 and FIG. 5, lane change module 308 includes, but is not limited to, lane change point module 401, lane change preparation distance module 402, trajectory predictor module 403, traffic rule module 404, iterative optimization algorithm module 405, and machine-learning module 406. Note that modules 401-406 may be integrated into fewer number of modules or a single module.

According to one embodiment, a driving environment is perceived as a part of perception process performed by perception module 302 based on sensor data obtained from various sensors mounted on an ADV such as the sensors as shown in FIG. 2. For example, one or more obstacles are detected. Based on the perception information, path planning is performed by path planning module 501. In response to a request for changing lane from a first lane to a second lane, the lane change module 308 is configured to perform a lane-changing for the ADV. For example, lane change point module 401 is configured to identify a first lane change point for the ADV to change from the first lane to the second lane in a first trajectory of the ADV generated in view of the driving environment. Next, lane change preparation distance module 402 is configured to determine a lane change preparation distance with respect to the first lane change point. Then, trajectory predictor module 403 is configured to generate a second trajectory based on the lane change preparation distance, where the second trajectory having a second lane change point delayed from the first lane change point based on at least a portion of the lane change preparation distance. Thereafter, speed planning is performed by speed planning module 502 on the second trajectory to control the ADV to change lane from the first lane to the second lane according to the second trajectory with different speeds at different point in time. For example, an ST graph may be generated by ST graph generator 503 for speed planning.

FIG. 6 illustrates path planning for a lane-changing for an ADV 601. FIGS. 7A-7C illustrate speed planning for a lane-changing of an ADV 701. Safe and agile lane-changing, especially during heavy traffic, is a challenging task for autonomous driving system. Currently, for vehicle trajectory planning of the ADV (e.g., 601, 701), there may be two steps: path planning and speed planning. Path planning may aim at dealing with static or low-speed obstacles and generate a path that is collision-free with those obstacles. Speed planning on the other side, may aim at dealing with dynamic environment such as moving vehicles, pedestrians, etc. and manipulate speeds of the ADV. During every frame of operations, the planning module may first perform path planning. Then the planning module may run speed planning.

As illustrated in FIG. 6, in path planning, a drivable path boundary 630 is constructed. For example, quadratic programming may be used to formulate a problem with an objective being a lane's center-line and constraints composed of the decided drivable path boundary 630 as well as some other limits on lateral speed/acceleration/jerk, etc. A planned path 610 may be determined.

During a lane-changing or switching from an original lane (e.g., 611, 711) to a target lane (e.g., 612, 712), since the ADV (e.g., 601, 701) is mostly dealing with dynamic interaction with obstacles (e.g., 602, 603, 702, 703, etc.), currently speed planning module plays the major role.

As illustrated in FIGS. 7A-7C, after a path of the ADV is planned, an ST graph 720 may be generated. ST graph indicates a distance travelled with respect to time, where s is the distance along a planned path, and t is the time. For example, an ST graph may be generated as part of a rough speed profile. All obstacles (e.g., 702, 703) may be mapped onto the ST graph 720. For example, an obstacle 702 may be mapped to a corresponding feature 722 in the ST graph 720, and another obstacle 703 may be mapped to another corresponding feature 723 in the ST graph 720. Then, an ST-line for the ADV may be generated. For example, there may be three possible ST lines 741, 742 and 743 for the ADV 701. The ST line 742 may be an optimized ST line. Based on the planned path (e.g., 610) and the ST-line (e.g., 742), a detailed planned trajectory for the ADV (e.g., 601, 701) may be determined.

Figure 8A:
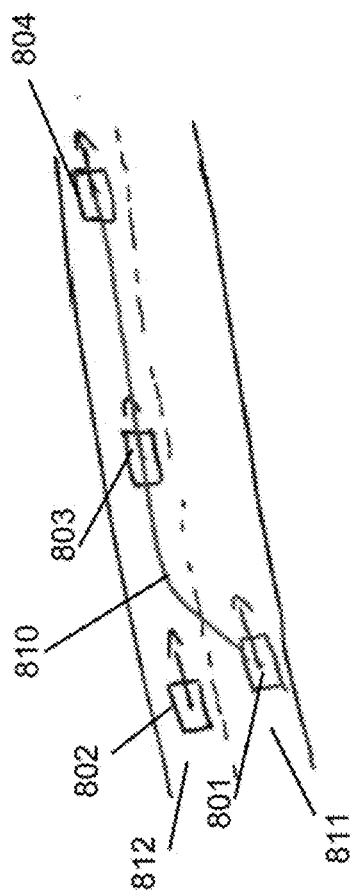
FIGS. 8A-8B illustrate a station-time graph (ST graph) for a lane change.
Figure 8B:
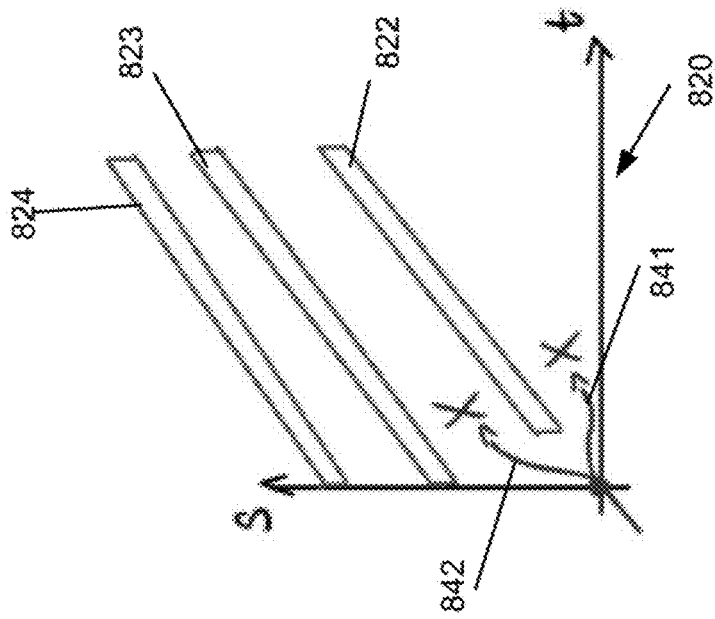

FIGS. 8A-8B further illustrate an ST graph for a lane-changing, as another example of current motion planning. An ADV 801 is driving on an original lane 811 and need to perform a lane-changing form the original lane 811 to a target lane 812. There may be one or more obstacles 802, 803, 804 near the ADV 801. A path 810 of the ADV is planned to start the lane-changing directly, as illustrated in FIG. 8A. An ST graph 820 may be generated, as illustrated in FIG. 8A. All obstacles (e.g., 802, 803, 804) may be mapped onto corresponding features (e.g., 822, 823, 824) in the ST graph 820. Then, two ST lines 841 and 842 for the ADV 801 may be generated. However, as illustrated in FIG. 8B, neither of the two ST lines 841 and 842 may be an optimized ST line, for example, due to undesirable speed acceleration or deceleration. It might be a difficult task for the speed planning to find a trajectory for the ADV in this situation.

In certain situations, for example, when there is another obstacle (e.g., 802) right next to the ADV (e.g., 801), the ADV (e.g., 801) may need to go along the original lane (e.g., 811) longer, to either speed up or slow down, to find a possible gap for the lane-changing, rather than directly starting the lane-changing. Current path planning algorithm doesn't solve this problem. Thus, path planning module may need to improve to solve the above problem. Therefore, there may be a need to develop a method to improve current motion planning for an ADV.

FIG. 9A illustrates an example of a method for planning for a lane-changing for an ADV 901 according to one embodiment. The method disclosed herein aims at solving the problem in planning for a lane-changing for an ADV as discussed above. In this method, in planning for a lane-changing for the ADV 901, a lane change preparation distance S 935 is estimated before the lane-changing. Then, a new path 930 of the ADV 901 is planned, by path planning module 501, based on the lane change preparation distance S 935. The method improves the lane-changing by planning a smarter path for the ADV 901 rather than only manipulating speeds of the ADV 901. In this way, the speed planning for the lane-changing is simplified, and the overall planned trajectory of the ADV 901 is safe, smooth and intelligent.

During the lane-changing, especially in heavy traffics, a target "gap" in a target lane 912 is needed to fit the ADV 901 in. With this target "gap" in mind, the ADV 901 may be controlled to adjust a relative position of the ADV 901 accordingly, while sending signals to drivers of surrounding obstacles indicating an intent to change from an original lane 911 to the target lane 912. The ADV 901 may be controlled to perform the lane-changing once the target "gap" is available, thus being safe to change from the original lane 911 to the target lane 912.

Before the lane-changing, a lane change preparation time T may be needed in order to prepare and adjust a relative position of the ADV 901 to the target "gap". However, during path planning, a time dimension is not in the picture yet. But the lane change preparation time T may be mapped to a lane change preparation distance S 935 in the path planning. In one embodiment, the lane change preparation distance S 935 refers to a distance from an original lane change point 921, as illustrated in FIG. 9A. For example, the lane change preparation distance S may be a distance between the original lane change point 921 to a point at which a center of the ADV 901 is along a center line of the target lane 912. In one embodiment, a lane change point refers to a point at which an ADV starts to change lane from an original lane to a target lane. For example, a lane change point may refer to a point at which a center of an ADV is off from a center line of a lane in a path of the ADV. For example, the original lane change point 921 may refer to the point that the center of the ADV 901 is off from a center line of the original lane 911 in a previously generated path 910.

As illustrated in FIG. 9A, in path planning, a drivable path boundary 940 is constructed, e.g., by the path planning module 501. For example, quadratic programming may be used, with an objective being a lane's center-line and constraints composed of the determined drivable path boundary 940, as well as some other limits on lateral speed/acceleration/jerk, etc. The new planned path 930 may be determined within the drivable path boundary 940 based on the preparation distance S 935.

Based on a state of the ADV 901 and a traffic condition, an estimation of the lane change preparation distance S 935 may be determined. For example, the traffic condition may be perceived by sensors mounted on the ADV. In one embodiment, the lane change preparation distance S may be determined based on a state of the ADV 901 and/or a driving environment perceived by the sensors mounted on the ADV. For example, the sensors may detect one or more obstacles in the target lane 912 or the original lane 911. For example, the driving environment may include a current traffic condition of the original lane 911 and the target lane 912.

In one embodiment, the lane change preparation distance S 935 may result from a set of rules in view of a current traffic condition of the first lane and the second lane. For example, considering obstacles 902, 903 and 904, path planning module 501 may calculate the lane change preparation distance S 935 to fit the ADV 901 in the target "gap" in the target lane 912 to avoid collisions with the obstacles 902, 903 and 904 based on a set of traffic rules. For example, the set of rules may include one or more lane changing rules based on a speed of the ADV 901, or one or more distances of the ADV 901 with respect to one or more obstacles 902, 903 and 904.

In one embodiment, the lane change preparation distance S 935 may be determined based on an iterative optimization algorithm. For example, an initial lane change preparation distance may be used as a starting point. After the iterative optimization algorithm, the lane change preparation distance S 935 may be determined.

In one embodiment, the lane change preparation distance S 935 may be determined by applying a machine-learning model on a set of features describing the driving environment surrounding the ADV. For example, a machine-learning model may be used to learn a relationship between a lane change preparation distance and the driving environment, and determine the lane change preparation distance S 935.

FIG. 9B illustrates a station-time graph (ST graph) for the ADV 901. Referring to FIG. 9A and FIG. 9B, an ST graph 920 may be generated for the lane changing of the ADV 901 based on the lane change preparation distance S 935. All obstacles (e.g., 902, 903, 904) may be mapped onto corresponding features (e.g., blocks 922, 923, 924) in the ST graph 920. Given the lane change preparation distance S 935, a chunk of length=S in the target lane 912 may be removed out of the path boundary. Since the optimized path must be in the path boundary, this step ensures that the final path 930 of the ADV 901 will not step into the target lane 912 until the lane change preparation distance S meters later, as illustrated in FIG. 9A. The corresponding features (e.g., blocks 922, 923, 924) of the obstacles (e.g., 902, 903, 904) in the ST graph 920 may be moved up and/or to the right, as illustrated in FIG. 9B. An optimized new trajectory (e.g., 941, 942) may be generated, as illustrated in FIG. 9B.

For subsequent frames as the ADV 901 is moving forward, the lane change preparation distance S 935 may be shrunk dynamically until eventually it disappears.

For speed planning, compared with the previously generated path 910 that initiates a lane-changing immediately, the new path 930 has a new lane change point 931 that is delayed from the previously generated lane change point 921. For example, the new lane change point 931 may refer to the point that the center of the ADV 901 is off from a center line of the original lane 911 in the new path 930. In one embodiment, the new path 930 may stay in the original lane 911 yet leans towards the target lane 912 within the lane change preparation distance S 935.

As illustrated in FIG. 9B, because the corresponding features (e.g., 922, 923, 924) of all the obstacles (e.g., 902, 903, 904) are shifted up and/or right in the ST graph 920 based on the lane change preparation distance S 935, there is more room for the speed planner to plan a safe and consistent speed allocation. Thus, the task of finding an optimized ST-line (e.g., 941, 942) for the ADV 901 in the ST-graph 920 is simplified. For example, the speed planning module 502 of the ADV 901 may perform speed planning on the new path 930. The speed planning module 502 may perform speed planning based on the optimized ST-line (e.g., 941, 942) according to the new path 930 with different speeds at different points in time.

Therefore, the overall planned trajectory 930 is safe, smooth and intelligent by this method. In addition, the fact that the ADV 901 leans towards the target lane 912 within the lane change preparation distance S 935 is a signal to drivers of surrounding obstacles that the ADV intends to change lane. For most of the time, the drivers may respond accordingly and make the lane-changing for the ADV 901 easier.

Figure 10:
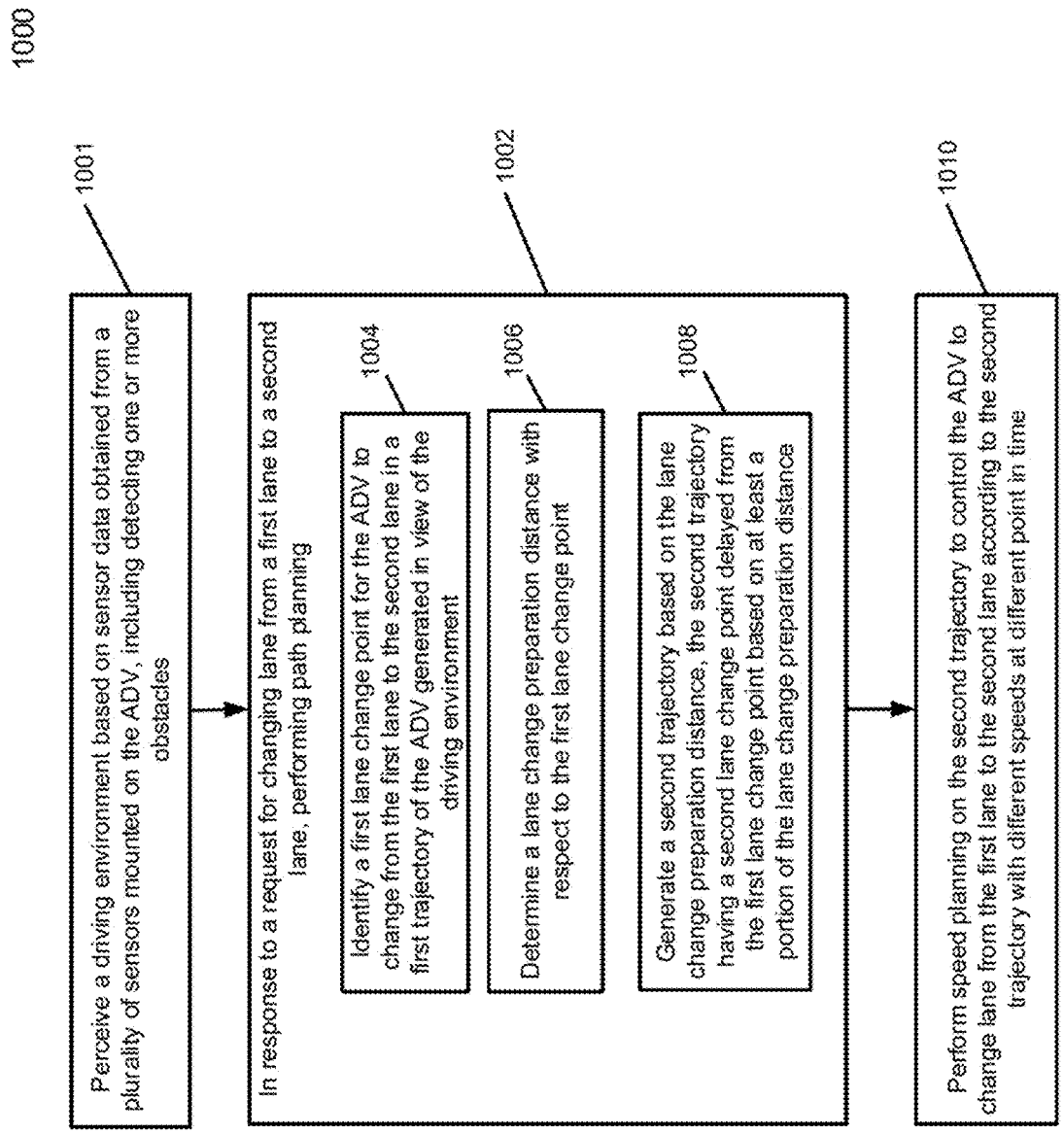
FIG. 10 is a flow diagram illustrating an example of a process for planning a lane change based on a preparation distance for operating an ADV according to one embodiment.

FIG. 10 is a flow diagram illustrating an example of a process 1000 for planning a lane change based on a lane change preparation distance for operating an ADV according to one embodiment. Process 1000 may be performed by processing logic of the ADV which may include software, hardware, or a combination thereof. For example, process 1000 may be performed by planning module 305. Referring to FIG. 10, in operation 1001, processing logic perceives a driving environment based on sensor data obtained from a plurality of sensors mounted on the ADV, including detecting one or more obstacles. In operation 1002, processing logic performs path planning in response to a request for changing lane from a first lane to a second lane. Operation 1002 includes operations 1004, 1006 and 1008. In performing path planning, processing logic identifies a first lane change point for the ADV to change from the first lane to the second lane in a first trajectory of the ADV generated in view of the driving environment in operation 1004, determines a lane change preparation distance with respect to the first lane change point in operation 1006, and generates a second trajectory based on the lane change preparation distance in operation 1008, where the second trajectory has a second lane change point delayed from the first lane change point based on at least a portion of the lane change preparation distance. In operation 1010, processing logic performs speed planning on the second trajectory to control the ADV to change lane from the first lane to the second lane according to the second trajectory with different speeds at different points in time.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for operating an autonomous driving vehicle (ADV), the method comprising:
    perceiving a driving environment based on sensor data obtained from a plurality of sensors mounted on the ADV, including detecting one or more obstacles;
    in response to a request for changing lane from a first lane to a second lane, performing path planning, including
        identifying a first lane change point for the ADV to change from the first lane to the second lane in a first trajectory of the ADV generated in view of the driving environment,
        determining a lane change preparation distance with respect to the first lane change point, and
        generating a second trajectory based on the lane change preparation distance, the second trajectory having a second lane change point delayed from the first lane change point based on at least a portion of the lane change preparation distance; and
    performing speed planning on the second trajectory to control the ADV to change lane from the first lane to the second lane according to the second trajectory with different speeds at different points in time.

2. The method of claim 1, wherein the second trajectory stays in the first lane and gradually leans towards the second lane within the lane change preparation distance.

3. The method of claim 1, wherein the lane change preparation distance is determined based on a state of the ADV and the driving environment.

4. The method of claim 1, wherein the lane change preparation distance is determined based on a set of rules in view of a current traffic condition of the first lane and the second lane.

5. The method of claim 4, wherein the set of rules including one or more lane changing rules based on a speed of the ADV, or one or more distances of the ADV with respect to one or more obstacles.

6. The method of claim 1, wherein the lane change preparation distance is determined based on an iterative optimization algorithm.

7. The method of claim 6, wherein the second path trajectory is generated based on the iterative optimization algorithm.

8. The method of claim 1, wherein the lane change preparation distance is determined by applying a machine-learning model on a set of features describing the driving environment surrounding the ADV.

9. The method of claim 1, further comprising generating a station-time graph (ST-graph) based on the lane change preparation distance.

10. A non-transitory machine-readable medium having instructions stored therein, which when executed by a processor, cause the processor to perform operations of an autonomous driving vehicle (ADV), the operations comprising:
    perceiving a driving environment based on sensor data obtained from a plurality of sensors mounted on the ADV, including detecting one or more obstacles;
    in response to a request for changing lane from a first lane to a second lane, performing path planning, including
        identifying a first lane change point for the ADV to change from the first lane to the second lane in a first trajectory of the ADV generated in view of the driving environment,
        determining a lane change preparation distance with respect to the first lane change point, and
        generating a second trajectory based on the lane change preparation distance, the second trajectory having a second lane change point delayed from the first lane change point based on at least a portion of the lane change preparation distance; and
    performing speed planning on the second trajectory to control the ADV to change lane from the first lane to the second lane according to the second trajectory with different speeds at different points in time.

11. The non-transitory machine-readable medium of claim 10, wherein the second trajectory stays in the first lane and gradually leans towards the second lane within the lane change preparation distance.

12. The non-transitory machine-readable medium of claim 10, wherein the lane change preparation distance is determined based on a state of the ADV and the driving environment.

13. The non-transitory machine-readable medium of claim 10, wherein the lane change preparation distance is determined based on a set of rules in view of a current traffic condition of the first lane and the second lane.

14. The non-transitory machine-readable medium of claim 10, wherein the lane change preparation distance is determined based on an iterative optimization algorithm.

15. The non-transitory machine-readable medium of claim 10, wherein the lane change preparation distance is determined by applying a machine-learning model on a set of features describing the driving environment surrounding the ADV.

16. The non-transitory machine-readable medium of claim 10, wherein the operations further comprise generating a station-time graph (ST-graph) based on the lane change preparation distance.

17. A data processing system, comprising:
 a processor; and
 a memory coupled to the processor to store instructions, which when executed by the processor, cause the processor to perform operations of an autonomous driving vehicle (ADV), the operations including
  perceiving a driving environment based on sensor data obtained from a plurality of sensors mounted on the ADV, including detecting one or more obstacles;
  in response to a request for changing lane from a first lane to a second lane, performing path planning, including
   identifying a first lane change point for the ADV to change from the first lane to the second lane in a first trajectory of the ADV generated in view of the driving environment,
   determining a lane change preparation distance with respect to the first lane change point, and
   generating a second trajectory based on the lane change preparation distance, the second trajectory having a second lane change point delayed from the first lane change point based on at least a portion of the lane change preparation distance; and
  performing speed planning on the second trajectory to control the ADV to change lane from the first lane to the second lane according to the second trajectory with different speeds at different points in time.

18. The data processing system of claim 17, wherein the second trajectory stays in the first lane and gradually leans towards the second lane within the lane change preparation distance.

19. The data processing system of claim 17, wherein the lane change preparation distance is determined based on a state of the ADV and the driving environment.

20. The data processing system of claim 17, wherein the lane change preparation distance is determined based on a set of rules in view of a current traffic condition of the first lane and the second lane.

21. The data processing system of claim 17, wherein the operations further comprise generating a station-time graph (ST-graph) based on the lane change preparation distance.

* * * * *